UNITED STATES PATENT OFFICE.

JAY I. O'BANION, OF SEATTLE, WASHINGTON.

OIL COMPOSITION.

1,417,103. Specification of Letters Patent. Patented May 23, 1922.

No Drawing. Application filed January 16, 1922. Serial No. 529,794.

*To all whom it may concern:*

Be it known that I, JAY I. O'BANION, a citizen of the United States, and resident of the city of Seattle, in the county of King and State of Washington, have invented certain new and useful Improvements in Oil Composition, of which the following is a specification.

This invention relates to improvements in the manufacture and composition of an oil base for paints and waterproofing material for fabric and the like.

The object of the invention is the provision of a material which will endure under the severest tests of the elements and extraordinary conditions of heat and cold as a base for the mixture of paints for outdoor use and by suitable thinning is particularly adapted for waterproofing clothing or other fabrics as well as leather, imitation leather and the like.

The invention consists in the novel composition of materials and the method of compounding the same, as will be fully described in the following specification, and set forth in the appended claims.

In compounding my new composition, I prepare the same by placing fifty gallons of raw linseed oil in a kettle with about seven pounds of vulcanized rubber material. The rubber I usually employ is that from discarded inner tubes of automobile tires which furnishes a good quality of rubber at a moderate cost. I boil the oil and rubber together for from three and one-half to four hours, gradually increasing the temperature to four hundred and forty degrees, Fahrenheit.

I find that the absorption of the rubber by the oil is in direct proportion to the amount of moisture in the oil and that when the moisture is entirely driven off that no more rubber will be taken up in the oil. In other words, in the boiling away of the moisture the rubber is absorbed by the oil to take the place of the moisture and no more rubber will be incorporated with the oil than an equivalent amount of moisture originally therein will warrant. I find, further, that the actual amount of rubber absorbed by the oil will approximate one pound to each ten gallons of oil depending on the amount of moisture present which varies slightly in different oils, but a surplus of rubber is added or seven pounds to fifty gallons in order to ensure that there will be sufficient rubber for all eventualities and to allow for variation in the gum-rubber content in the rubber compounds added.

I find that the rubber will disintegrate and combine with the oil beginning at about three hundred and twenty degrees, Fahrenheit. Accordingly, I bring the materials to that degree of temperature at a relatively rapid rate and then more slowly allow the heat to increase to four hundred and forty degrees where it is maintained for a considerable time totalling three and one-half to four hours.

The liquid is skimmed as it boils and when it is clear on top, it is allowed to cool until no fumes arise from the kettle when it is strained through garze and thoroughly cooled. I then add about five gallons of benzine or gasoline and five gallons of japan liquid drier and the mixture is stirred until the top takes on a creamy appearance. The mixture is allowed to set for about twelve hours and is then ready for use.

For paint oil, I usually employ more thinning material (benzine) and more of the drier. For waterproofing some fabrics, I also use more benzine, according to the nature of the case.

The oil thus treated is a superior product to mix with white lead for outside painting where exposed to weather as it will have better protective qualities than other oils known to me, as it has great adhesive qualities, and is not easily affected by heat nor will it check or peel under influence of climatic conditions. The material has been found extremely useful in waterproofing cement and in treating clothing and aeroplane linen as well as for general waterproofing purposes.

Having described my invention, what I claim, is—

1. A composition of matter composed of fifty gallons raw linseed oil, vulcanized rubber, seven pounds, benzine five gallons and japan liquid drier five gallons.

2. A method of compounding an oil composition consisting in boiling fifty gallons of raw linseed oil with seven pounds of vulcanized rubber, cooling the mixture and then adding five gallons of benzine and five gallons of japan liquid drier.

3. A method of compounding an oil composition consisting in boiling raw linseed oil with vulcanized rubber, cooling the mixture, and then adding benzine and japan liquid drier.

4. A method of compounding an oil composition consisting in boiling fifty gallons of raw linseed oil and seven pounds of vulcanized rubber for approximately four hours at 440 degrees temperature, cooling the mixture, and then adding five gallons of benzine and five gallons of liquid drier.

5. A method of compounding an oil composition consisting in boiling raw linseed oil and vulcanized rubber for approximately four hours at 440 degrees temperature, cooling the mixture, and then adding benzine and liquid drier.

JAY I. O'BANION.

Witness:
H. W. SELLANDER.